United States Patent
Nickel et al.

(10) Patent No.: US 11,192,327 B2
(45) Date of Patent: Dec. 7, 2021

(54) VOLUMINOUS MELTBLOWN NONWOVEN FABRIC WITH IMPROVED STACKABILITY AND STORABILITY

(71) Applicants: Axel Nickel, Hemmingen (DE); Norbert Jording, Bünde (DE)

(72) Inventors: Axel Nickel, Hemmingen (DE); Norbert Jording, Bünde (DE)

(*) Notice: Subject to any disclaimer, the term of this patent is extended or adjusted under 35 U.S.C. 154(b) by 0 days.

(21) Appl. No.: 16/628,260

(22) PCT Filed: Jul. 3, 2018

(86) PCT No.: PCT/EP2018/067936
§ 371 (c)(1),
(2) Date: Jan. 2, 2020

(87) PCT Pub. No.: WO2019/007949
PCT Pub. Date: Jan. 10, 2019

(65) Prior Publication Data
US 2020/0216990 A1    Jul. 9, 2020

(30) Foreign Application Priority Data
Jul. 3, 2017  (EP) ..................................... 17179327

(51) Int. Cl.
*B32B 3/04* (2006.01)
*B32B 3/08* (2006.01)
(Continued)

(52) U.S. Cl.
CPC ............... *B32B 5/022* (2013.01); *B32B 3/04* (2013.01); *B32B 3/085* (2013.01); *B32B 3/266* (2013.01);
(Continued)

(58) Field of Classification Search
None
See application file for complete search history.

(56) References Cited

U.S. PATENT DOCUMENTS 2,454,175 A * 11/1948 Hiavaty .................. D04H 1/736
428/113
2,746,892 A * 5/1956 Elfving .................... B60R 13/02
428/186
(Continued)

FOREIGN PATENT DOCUMENTS

CN    102560895 A  *  7/2012  ............. D04H 1/728
CN    102797112 A  *  11/2012
(Continued)

OTHER PUBLICATIONS

Choi et al., Strength properties of melt blown nonwoven webs, Jan. 1988 (Year: 1988).*
(Continued)

*Primary Examiner* — Jeffrey A Vonch
(74) *Attorney, Agent, or Firm* — Hershkovitz & Associates, PLLC; Abraham Hershkovitz; Eugene C. Rzucidlo

(57) ABSTRACT

The present invention relates to a meltblown nonwoven in the form of a sheet-like formation with a weight per unit area of 100 to 600 g/m² and with a density of 5 to 50 kg/m³, wherein the meltblown nonwoven (10) has at least one spacer (12), extending at least on one of the surfaces thereof and/or at least partially in the direction of the thickness of the meltblown nonwoven (10) and arranged in such a way that the meltblown nonwoven (10) has a compressibility of less than 10% when a pressure of 50 Pa is applied to its surface.

19 Claims, 2 Drawing Sheets

(51) Int. Cl.
  *B32B 3/24* (2006.01)
  *B32B 3/30* (2006.01)
  *B32B 5/02* (2006.01)
  *D04H 1/56* (2006.01)
  *D04H 1/74* (2006.01)
  *B32B 3/26* (2006.01)
  *B32B 5/14* (2006.01)
  *E04B 1/74* (2006.01)
  *E04B 1/86* (2006.01)
  *B32B 5/26* (2006.01)
  *B32B 7/08* (2019.01)
  *B32B 7/12* (2006.01)
  *D04H 1/62* (2006.01)
  *E04B 1/84* (2006.01)
  *D04H 3/16* (2006.01)
  *D04H 3/02* (2006.01)

(52) U.S. Cl.
  CPC .......... *B32B 3/30* (2013.01); *B32B 5/147* (2013.01); *D04H 1/56* (2013.01); *D04H 1/565* (2013.01); *D04H 1/74* (2013.01); *B32B 5/26* (2013.01); *B32B 5/265* (2021.05); *B32B 5/266* (2021.05); *B32B 7/08* (2013.01); *B32B 7/12* (2013.01); *B32B 2305/18* (2013.01); *B32B 2307/718* (2013.01); *B32B 2307/72* (2013.01); *B32B 2307/722* (2013.01); *B32B 2307/734* (2013.01); *D04H 1/62* (2013.01); *D04H 3/02* (2013.01); *D04H 3/16* (2013.01); *E04B 1/74* (2013.01); *E04B 1/8404* (2013.01); *E04B 1/86* (2013.01); *E04B 2001/742* (2013.01); *Y10T 428/2419* (2015.01); *Y10T 428/2495* (2015.01); *Y10T 428/24174* (2015.01); *Y10T 428/24182* (2015.01); *Y10T 428/24231* (2015.01); *Y10T 428/24331* (2015.01); *Y10T 428/24339* (2015.01); *Y10T 428/24479* (2015.01); *Y10T 428/24595* (2015.01); *Y10T 428/24603* (2015.01); *Y10T 428/24992* (2015.01); *Y10T 442/68* (2015.04)

(56) References Cited

U.S. PATENT DOCUMENTS

| | | | | |
|---|---|---|---|---|
| 3,542,634 A * | 11/1970 | Such | D04H 1/544 | 428/135 |
| 3,746,607 A * | 7/1973 | Sibbach | C08L 23/02 | 428/167 |
| 3,755,527 A | 8/1973 | Keller et al. | | |
| 3,812,001 A * | 5/1974 | Ryan | A61F 13/532 | 428/178 |
| 4,041,951 A * | 8/1977 | Sanford | A61F 13/51104 | 604/375 |
| 4,118,531 A | 10/1978 | Hauser | | |
| 4,196,245 A * | 4/1980 | Kitson | D04H 3/007 | 428/198 |
| 4,375,446 A | 3/1983 | Fujii et al. | | |
| 4,380,570 A | 4/1983 | Schwarz | | |
| 4,409,282 A * | 10/1983 | Fujii | D04H 3/005 | 428/219 |
| 4,493,868 A * | 1/1985 | Meitner | B32B 5/26 | 428/171 |
| 4,588,635 A * | 5/1986 | Donovan | D04H 1/4342 | 442/333 |
| 4,681,801 A * | 7/1987 | Eian | D04H 1/56 | 428/373 |
| 4,689,899 A * | 9/1987 | Larson | A43B 17/14 | 36/11.5 |
| 4,837,067 A * | 6/1989 | Carey, Jr. | D04H 1/74 | 428/108 |
| 5,043,207 A * | 8/1991 | Donovan | D04H 3/011 | 442/120 |
| 5,180,620 A * | 1/1993 | Mende | D04H 3/16 | 428/138 |
| 5,298,694 A * | 3/1994 | Thompson | B32B 5/26 | 181/286 |
| 5,443,893 A * | 8/1995 | Herzberg | B32B 5/26 | 428/198 |
| 5,484,641 A * | 1/1996 | Rotter | D04H 1/64 | 156/253 |
| 5,532,050 A * | 7/1996 | Brooks | B29C 43/006 | 156/296 |
| 5,558,924 A * | 9/1996 | Chien | D04H 1/74 | 156/205 |
| 5,571,592 A * | 11/1996 | McGregor | B32B 5/26 | 428/71 |
| 5,575,874 A * | 11/1996 | Griesbach, III | A61F 13/512 | 156/167 |
| 5,639,700 A * | 6/1997 | Braun | B01D 46/103 | 442/340 |
| 5,669,895 A * | 9/1997 | Murakami | A61F 13/53708 | 604/358 |
| 5,702,801 A * | 12/1997 | Chien | D04H 1/74 | 156/181 |
| 5,837,625 A * | 11/1998 | Phillips | D04H 1/02 | 442/337 |
| 5,860,163 A * | 1/1999 | Aldridge | A41D 31/065 | 2/81 |
| 5,955,174 A * | 9/1999 | Wadsworth | D04H 1/559 | 428/181 |
| 5,958,322 A * | 9/1999 | Thompson | D04H 3/16 | 264/342 RE |
| 5,993,714 A * | 11/1999 | Sawyer | D04H 3/16 | 264/168 |
| 6,136,124 A * | 10/2000 | Wagner | B31F 1/07 | 156/167 |
| 6,177,369 B1 * | 1/2001 | Kwok | D04H 1/42 | 442/327 |
| 6,217,691 B1 * | 4/2001 | Vair, Jr. | E04B 1/84 | 156/176 |
| 6,344,102 B1 | 2/2002 | Wagner | | |
| 6,588,080 B1 * | 7/2003 | Neely | D04H 3/02 | 28/122 |
| 6,635,136 B2 * | 10/2003 | White | A61F 13/15634 | 156/181 |
| 6,739,024 B1 * | 5/2004 | Wagner | D04H 3/14 | 26/7 |
| 6,750,166 B1 * | 6/2004 | Etzold | D04H 1/54 | 28/103 |
| 6,867,156 B1 * | 3/2005 | White | A61F 13/537 | 442/334 |
| 2001/0009711 A1 * | 7/2001 | Latimer | D04H 1/74 | 428/182 |
| 2001/0023008 A1 * | 9/2001 | Offermann | F16L 59/065 | 428/119 |
| 2002/0010448 A1 * | 1/2002 | Yoshimasa | A61F 13/15203 | 604/378 |
| 2003/0080051 A1 * | 5/2003 | Aune | D04H 3/07 | 210/505 |
| 2003/0096079 A1 * | 5/2003 | Messina | B32B 27/40 | 428/85 |
| 2003/0118785 A1 * | 6/2003 | Aneja | D04H 1/558 | 428/182 |
| 2003/0129356 A1 * | 7/2003 | Laskorski | B32B 3/30 | 428/102 |
| 2003/0143376 A1 * | 7/2003 | Toyoshima | A61F 13/5116 | 428/156 |
| 2003/0199216 A1 * | 10/2003 | Gomez | G10K 11/168 | 442/327 |
| 2004/0023014 A1 * | 2/2004 | Williamson | G10K 11/162 | 428/292.1 |
| 2004/0097155 A1 | 5/2004 | Olson et al. | | |
| 2004/0111782 A1 * | 6/2004 | Lenormand | A41D 31/065 | 2/69 |
| 2004/0121686 A1 * | 6/2004 | Wong | B29C 55/18 | 442/327 |

(56) References Cited

U.S. PATENT DOCUMENTS

| | | | | |
|---|---|---|---|---|
| 2004/0131820 A1* | | 7/2004 | Turner | A61F 13/15707 428/92 |
| 2004/0241399 A1* | | 12/2004 | Marmon | D04H 13/00 428/196 |
| 2004/0265533 A1* | | 12/2004 | Hoying | B29C 55/18 428/92 |
| 2005/0026527 A1* | | 2/2005 | Schmidt | D04H 3/03 442/381 |
| 2005/0050619 A1* | | 3/2005 | Dunn | B32B 3/12 2/458 |
| 2005/0100713 A1* | | 5/2005 | Busam | A61F 13/51108 428/178 |
| 2005/0191921 A1* | | 9/2005 | Tilton | B32B 5/14 442/120 |
| 2006/0019056 A1* | | 1/2006 | Turner | B32B 38/0012 428/85 |
| 2006/0065482 A1* | | 3/2006 | Schmidft | E04B 1/82 181/290 |
| 2006/0225952 A1* | | 10/2006 | Takayasu | G10K 11/162 181/294 |
| 2006/0254855 A1* | | 11/2006 | Loftus | E04B 1/84 181/293 |
| 2006/0286343 A1* | | 12/2006 | Curro | B32B 27/12 428/131 |
| 2007/0042662 A1* | | 2/2007 | Noelle | D04H 3/011 442/327 |
| 2007/0075015 A1* | | 4/2007 | Bates, III | D04H 1/56 210/505 |
| 2007/0269632 A1* | | 11/2007 | Ota | G10K 11/162 428/98 |
| 2008/0026661 A1* | | 1/2008 | Fox | D04H 5/06 442/344 |
| 2008/0057263 A1* | | 3/2008 | Chien | B65H 45/101 428/98 |
| 2008/0057283 A1* | | 3/2008 | Blinkhorn | D04H 1/485 428/292.1 |
| 2008/0318024 A1* | | 12/2008 | Angadjivand | D01D 4/025 428/311.51 |
| 2009/0130939 A1* | | 5/2009 | Kimura | D04H 1/435 442/364 |
| 2010/0066121 A1* | | 3/2010 | Gross | D04H 1/5412 296/146.5 |
| 2010/0199406 A1* | | 8/2010 | Dua | D06H 5/00 2/115 |
| 2010/0199520 A1* | | 8/2010 | Dua | B29C 66/30326 36/87 |
| 2010/0275543 A1* | | 11/2010 | Deblander | D04H 1/559 52/404.1 |
| 2010/0291213 A1* | | 11/2010 | Berrigan | D04H 1/407 424/484 |
| 2010/0310845 A1* | | 12/2010 | Bond | A61F 13/5376 428/219 |
| 2011/0151737 A1* | | 6/2011 | Moore | D04H 3/007 442/334 |
| 2011/0151738 A1* | | 6/2011 | Moore | D04H 1/485 442/334 |
| 2011/0152808 A1* | | 6/2011 | Jackson | A61L 15/24 604/367 |
| 2012/0237718 A1* | | 9/2012 | Weisman | D04H 3/011 428/89 |
| 2012/0315225 A1* | | 12/2012 | Porbeni | D04H 1/43825 424/49 |
| 2013/0034686 A1* | | 2/2013 | Mitsuno | D04H 3/16 428/131 |
| 2013/0078422 A1* | | 3/2013 | Tinianov | B32B 5/022 428/138 |
| 2013/0183476 A1* | | 7/2013 | Schmitz | B29C 66/836 428/57 |
| 2013/0211358 A1 | | 8/2013 | Kikkawa et al. | |
| 2013/0232712 A1* | | 9/2013 | Kawai | D04H 1/558 15/209.1 |
| 2013/0280481 A1* | | 10/2013 | Mitsuno | D04H 5/06 428/131 |
| 2014/0024279 A1* | | 1/2014 | Berrigan | D04H 1/56 442/341 |
| 2014/0037904 A1* | | 2/2014 | Baker | B29C 43/24 428/156 |
| 2014/0097037 A1* | | 4/2014 | Wingfield | E04F 15/203 181/290 |
| 2014/0224576 A1* | | 8/2014 | Staudt | E04B 1/84 181/290 |
| 2014/0234575 A1* | | 8/2014 | Mitsuno | B32B 5/145 428/137 |
| 2014/0356574 A1* | | 12/2014 | Conolly | B32B 5/24 428/138 |
| 2015/0053606 A1* | | 2/2015 | Sakamoto | D04H 1/558 210/493.5 |
| 2015/0211160 A1* | | 7/2015 | Hassan | D04H 3/16 428/141 |
| 2015/0314559 A1* | | 11/2015 | Lee | B29C 48/21 428/172 |
| 2016/0297168 A1* | | 10/2016 | Chien | B32B 3/263 |
| 2016/0298266 A1* | | 10/2016 | Zillig | D01D 5/084 |
| 2017/0029994 A1* | | 2/2017 | Ashraf | D04H 3/11 |
| 2017/0152616 A1* | | 6/2017 | Brown | D04H 1/70 |
| 2018/0155859 A1* | | 6/2018 | Gretton | D04H 1/4266 |
| 2020/0165759 A1* | | 5/2020 | Nickel | D04H 3/007 |

FOREIGN PATENT DOCUMENTS

| Country | Number | | Date | Classification |
|---|---|---|---|---|
| CN | 103161032 A | * | 6/2013 | |
| CN | 103276535 A | * | 9/2013 | D04H 1/728 |
| DE | 1785712 C3 | | 1/1979 | |
| DE | 29616418 U1 | * | 11/1996 | D04H 1/5418 |
| EP | 0064792 A2 | * | 11/1982 | B32B 5/26 |
| EP | 0156160 A2 | | 10/1985 | |
| EP | 0350627 A1 | * | 1/1990 | D04H 1/46 |
| EP | 0558205 A1 | * | 9/1993 | D04H 11/04 |
| EP | 0600844 A1 | * | 6/1994 | D04H 1/43832 |
| EP | 1227181 A2 | * | 7/2002 | B29C 59/04 |
| EP | 1234906 A1 | * | 8/2002 | D04H 5/06 |
| EP | 2630939 A1 | | 8/2013 | |
| EP | 2711478 A2 | * | 3/2014 | E04B 1/7662 |
| GB | 2063321 A | * | 6/1981 | D04H 3/02 |
| JP | 02182213 A | * | 7/1990 | |
| JP | 02234965 A | * | 9/1990 | D04H 11/04 |
| JP | 11172560 A | * | 6/1999 | A41D 31/085 |
| JP | 2001064859 A | * | 3/2001 | D04H 5/06 |
| KR | 20110122566 A | * | 11/2011 | F16L 59/029 |
| WO | WO-9900540 A1 | * | 1/1999 | D04H 1/55 |
| WO | WO-9935926 A1 | * | 7/1999 | A41D 31/085 |
| WO | 99/49119 A1 | | 9/1999 | |
| WO | WO-0006379 A1 | * | 2/2000 | F16L 59/029 |
| WO | WO-0036199 A1 | * | 6/2000 | D04H 1/76 |
| WO | WO-2004029349 A1 | * | 4/2004 | D04H 3/14 |
| WO | WO-2007003147 A1 | * | 1/2007 | A41D 31/065 |
| WO | WO-2007082558 A1 | * | 7/2007 | E04B 1/78 |
| WO | WO-2010100422 A1 | * | 9/2010 | E04B 1/7662 |

OTHER PUBLICATIONS

Parikh et al., Compressional Behavior of Perpendicular-Laid Nonwovens Containing Cotton, Jun. 2002, Textile Research Journal, vol. 72, Issue 6 (Year: 2002).*

Parikh et al., Compressibility of Cotton Blend Perpendicular-Laid Nonwovens, Jan. 2004, Textile Research Journal, vol. 74, Issue 1 (Year: 2004).*

Kang et al., Anisotropy in structure and mechanical properties of perpendicular-laid nonwovens, Feb. 2008, Journal of Materials Science, vol. 43 (Year: 2008).*

Yang et al, Sound absorption and compression properties of perpendicular-laid nonwovens, Jan. 2018, Textile Research Journal, vol. 89, Issue 4 (Year: 2018).*

* cited by examiner

VOLUMINOUS MELTBLOWN NONWOVEN FABRIC WITH IMPROVED STACKABILITY AND STORABILITY

The present invention relates to a voluminous meltblown nonwoven fabric having improved stackability and storability. The present invention further relates to a method for manufacturing such a meltblown nonwoven fabric.

Felts and nonwoven fabrics are usually manufactured from staple fibers and/or continuous filaments using known mechanical or aerodynamic methods. One known aerodynamic process is the meltblown method based on the Exxon principle as described in U.S. Pat. No. 3,755,527, for example. In that method, a low-viscosity polymer is extruded through capillaries located at a nozzle tip. The polymer droplets that form are then acted upon from two sides with a high-temperature, high-speed air flow that is referred to as blast air, whereby the polymer droplets are drawn into a free polymer jet in the form of fine filaments. As a result of the streams of air impinging on the polymer droplets at an acute angle, an oscillation process that is present in the free jet then present is then induced in the free polymer jet, resulting in the occurrence of high-frequency processes that accelerate the polymer strands beyond the speed of the blast air. As a result, the polymer strands are additionally stretched, so that the filaments obtained after deposition of the filaments on a carrier and after cooling can have a diameter and a fineness of a few micrometers in the single-digit range or even less. The meltblown nonwoven fabrics or meltblown nonwovens manufactured in this manner are used for a variety of applications, such as barrier functions in the hygiene sector, for example. For these applications, the filaments are deposited on the carrier as a flat, two-dimensional nonwoven fabric.

Another known meltblown process was developed by Biax Fiberfilm Corp. and is described, for example, in U.S. Pat. No. 4,380,570.

For some nonwoven applications, such as the use thereof as acoustic damping materials, the nonwoven fabrics must be voluminous i.e., have a large internal void volume. Such voluminous, three-dimensional meltblown nonwoven fabrics can be manufactured by depositing the filaments formed between two suction drums or double drums, as described in DE 17 85 712 C3 and in U.S. Pat. No. 4,375,446, for example. These voluminous meltblown nonwoven fabrics can be used in particular as acoustic damping materials, but also for other applications such as oil absorbers, for example. However, these voluminous meltblown nonwoven fabrics have the disadvantage that they are highly ductile and characterized by poor relaxation, which results in a loss of volume following a compressive load. As a result, these voluminous meltblown nonwoven fabrics can only be stacked without unwanted deformation under certain constraints. Therefore, they must be stored in an elaborate manner in order to avoid undesirable deformation as a result of stacking, for example.

It is therefore the object of the present invention to provide a voluminous meltblown nonwoven fabric that is easily stackable without causing undesirable deformations and that also retains its thickness-specific acoustic properties, such as its absorption coefficient.

According to the invention, this object is achieved by a voluminous meltblown nonwoven fabric in the form of a planar structure with a weight per unit area of from 100 to 600 g/m$^2$ and with a density of from 5 to 50 kg/m$^3$, the meltblown nonwoven fabric 10 having at least one spacer 12 extending on at least one of its surfaces and/or partially in the direction of thickness of the meltblown nonwoven fabric 10 that is arranged such that the meltblown nonwoven fabric has a compressibility of less than 10% when a pressure of 50 Pa is applied to its surface.

By virtue of the fact that the voluminous meltblown nonwoven fabric, namely with a weight per unit area of from 100 to 600 g/m$^2$ and with a density of from 5 to 50 kg/m$^3$, has at least one and preferably a plurality of spacers that extend at least partially in the direction of thickness of the meltblown nonwoven fabric and are arranged such that the meltblown nonwoven fabric has a compressibility of less than 10% when a pressure of 50 Pa is applied to its surface, various layers of the voluminous nonwoven fabric can be easily stacked on top of one another without causing unacceptable deformation and particularly compression of the nonwoven fabric, since the various layers each contact their spacers and are mutually spaced apart by these in such a way that the upper layers do not compress the lower layers by their weight or at least do not compress them to an appreciable extent.

Easy storability of the voluminous meltblown nonwoven fabric is thus achieved. In addition, through the prevention of appreciable compression, the voluminous meltblown nonwoven fabric retains its thickness-specific acoustic properties, such as its absorption coefficient.

For the purposes of the present patent application, "absorption" means the acoustic absorption of sound waves or, in other words, the "dissipation of exergy from pressure waves." In order to fulfill this function even at lower frequencies, the laws of physics require that the material have a certain thickness and voluminosity.

For the purposes of the present patent application, a "spacer" refers to a dimensionally stable structure having sufficient rigidity as to permit no appreciable change in the thickness of the nonwoven components under the compressive load that typically occurs when the components are stacked.

For the purposes of the present invention, a "meltblown nonwoven fabric" is understood to mean a nonwoven fabric that is manufactured using one of the known meltblown processes.

Methods for producing such meltblown nonwoven fabrics are described in U.S. Pat. No. 4,118,531, in U.S. Pat. No. 4,375,446, in U.S. Pat. No. 4,380,570, and in DE 17 85 712 C3, for example.

In addition, for the purposes of the present invention, a "flat structure" is understood to mean a three-dimensional structure whose thickness is considerably less than the area defined by its length and width, and in particular a three-dimensional structure in which the thickness is at most 20% of the area that is defined by its length and width.

According to the present invention, the compressibility of a meltblown nonwoven fabric is measured by applying a corresponding pressure (50 Pa in the aforementioned case) to the meltblown nonwoven fabric. The thicknesses of the meltblown nonwoven fabric are measured before and after application of the pressure. The difference between the thickness of the nonwoven fabric before application of the pressure and the thickness of the nonwoven fabric after application of the pressure divided by the thickness of the nonwoven fabric before application of the pressure multiplied by 100 yields the compressibility of the meltblown nonwoven fabric in percent. The thickness of the nonwoven fabric is the distance between the upper side of the nonwoven fabric, which may be defined by the spacers, and lower side of the nonwoven fabric, which may be defined by the spacers. The measurement of the thickness of the nonwoven fabric before application of the pressure and the thickness of the nonwoven fabric after application of the pressure is preferably carried out according to the method described in DIN EN ISO 9073-2, methods B and C, or according to the method described in SAE J1355, version of January 2007; in the latter method, a corresponding test pressure corresponding to 50 Pa is applied in order to measure the thickness of the nonwoven fabric after application of the pressure.

Alternatively, the compressibility can also be readily determined by placing the meltblown nonwoven fabric between two planar expanded polystyrene sheets having a weight of 20 g/m² corresponding to 0.2 Pa, for example, and, without application of pressure, measuring the thickness of the nonwoven fabric before application of pressure as the distance between the two surfaces of the sheets facing toward the nonwoven fabric. It is important to ensure that both sheets are plane-parallel to the contact surface. A corresponding pressure of 50 Pa in the abovementioned case is then applied to the sheets, for example by placing a corresponding weight onto the sheet. As will readily be understood, sheets other than expanded polystyrene sheets can also be used for this purpose, in which case the weight of the upper sheet must be taken into account so that an appropriate weight is then put in place so that the pressure resulting from the weight of the sheet and the applied weight corresponds to 50 Pa. Alternatively, the sheets can also be subjected to pressure by a clamping device so that the pressure corresponds to 50 Pa. The thickness of the nonwoven fabric is then determined after application of the pressure as the distance between the two edges of the two sheets that are adjacent to the nonwoven fabric.

Preferably, the meltblown nonwoven fabric has a compressibility of less than 10% when a pressure of 75 Pa is applied to its surface. More preferably, the meltblown nonwoven fabric has a compressibility of less than 10% when a pressure of 100 Pa, more preferably of 125 Pa, even more preferably of 150 Pa, especially preferably of 175 Pa, very especially preferably of 200 Pa, and most preferably of 250 Pa is applied to its surface.

In other words, when a pressure of 50 Pa is applied to its surface, the compressibility of the meltblown nonwoven fabric is less than 10%, preferably less than 5%, more preferably less than 2.5%, especially preferably less than 1%, very especially preferably less than 0.5%, and most preferably 0%.

In a development of the inventive idea, it is proposed that, when a pressure of 200 Pa is applied to its surface, the compressibility of the meltblown nonwoven fabric is less than 10%, preferably less than 5%, more preferably less than 2.5%, especially preferably less than 1%, very especially preferably less than 0.5%, and most preferably 0%.

The present invention is not limited with respect to the arrangement of the at least one spacer. Good results are achieved, for example, if the meltblown nonwoven fabric according to the invention has at least one and preferably a plurality of spacers that i) are arranged on the upper side and/or bottom of the nonwoven fabric and/or ii) extend at least partially through the nonwoven fabric and optionally over protrude beyond the upper side and/or the lower side of the nonwoven fabric.

According to a first especially preferred embodiment of the present invention, the at least one spacer is made of compressed nonwoven fabric. Preferably, the at least one spacer is a depression created by application of mechanical pressure, the side surfaces and the bottom of the depression being delimited by compressed nonwoven fabric. Preferably, the bottom of the depression delimited by the compressed nonwoven fabric is between 0% and up to 10% of the thickness of the meltblown nonwoven fabric below the lower side of the meltblown nonwoven fabric as seen in the direction of thickness, or it protrudes beyond the lower side of the nonwoven fabric. In this embodiment, spacers made of compressed nonwoven fabric are introduced into the nonwoven fabric that can be formed simply by putting a stamp in place having the shape of the depression to be introduced and pressing the stamp into the nonwoven fabric. By virtue of the much higher mechanical stability of compressed nonwoven fabric compared to the non-compressed nonwoven fabric, these spacers can accommodate the pressure of overlying nonwoven fabric layers without deformation and thus allow stackability of the meltblown nonwoven fabric.

For example, the depression can have a cuboidal or cylindrical cross-sectional shape.

Good results are obtained in this embodiment particularly if the depression has a width of from 0.1 to 5 times, especially preferably from 0.25 to 2 times, and most preferably from 0.3 times to 0.7 times the thickness of the nonwoven fabric. With a preferred thickness of the nonwoven fabric of 10 to 30 mm, the width of the depression is most preferably 5 to 10 mm. The "width of the depression" is understood to mean the longest extension of the depression in cross section, i.e., the diameter if the depression has a cylindrical cross-sectional shape.

In order to provide a good stackability without risk of deformation, it is proposed in a development of the invention that a plurality of spacers in the form of depressions that are delimited at their side surfaces and bottom by compressed nonwoven fabric be provided in the meltblown nonwoven fabric that are arranged at least substantially uniformly over the surface of the meltblown nonwoven fabric. These depressions are preferably spaced apart from one another by 50 to 500 mm, preferably by 100 to 300 mm, and especially preferably by 150 to 250 mm as seen on the nonwoven fabric plane. The aforementioned distances are those of each spacer from every other adjacent spacer in each direction of the nonwoven fabric plane. A good compromise is thus achieved between sufficiently high stackability and the lowest possible number of spacers.

According to a second embodiment of the present invention that represents an alternative to the aforementioned embodiment but is equally preferred, the at least one spacer that is arranged in the direction of thickness of the meltblown nonwoven fabric is an element that is made of a material other than nonwoven fabric.

Preferably, the material that is different from the nonwoven fabric is a dimensionally stable material such as one selected from the group consisting of metals, plastics, ceramics, wood, glass, and any combination of two or more of the aforementioned materials.

Particularly preferably, the material that is different from the nonwoven fabric consists of a related or compatible raw material, so that a material recycling of the nonwoven fabric including spacers is possible.

In this embodiment, the at least one spacer can be placed onto the upper side and/or lower side of the nonwoven fabric and preferably affixed with adhesive, with a connecting element, by thermal welding, or by mechanical pressing.

Alternatively, the at least one spacer can extend through an opening that was previously introduced in a pressure-free manner into the nonwoven fabric and have at least a dimension that is 90% to 100% of the thickness of the meltblown nonwoven fabric as viewed in the direction of thickness or protrude beyond the upper side and/or the lower side of the nonwoven fabric.

Simple manufacturability is achieved particularly if the at least one spacer has a cylindrical, cuboidal, or mushroom-like shape.

In order to provide a good stackability without risk of deformation, it is proposed in a development of the invention that a plurality of spacers be provided in the meltblown nonwoven fabric that are arranged at least substantially uniformly over the surface of the meltblown nonwoven fabric. These spacers are preferably spaced apart from one another by 50 to 500 mm, preferably 100 to 300 mm, and especially preferably 150 to 250 mm as seen on the nonwoven fabric plane.

According to a third, especially preferred embodiment of the present invention that represents an alternative to the aforementioned embodiment but is equally preferred, an additional nonwoven fabric is applied to the nonwoven fabric in some regions as a spacer, so that the total thickness in this region or in these regions of the meltblown nonwoven fabric is greater than that of the rest of the nonwoven fabric.

The additional nonwoven fabric can be affixed to the nonwoven fabric by means of adhesive, thermal welding, or mechanical pressing.

In a development of the inventive idea, it is proposed that the additional nonwoven fabric be applied to at least a portion of the edge region of the nonwoven fabric as a spacer, so that the total thickness in this edge region is greater than that of the rest of the nonwoven fabric.

This can be achieved, for example, simply by placing the additional nonwoven fabric onto at least a portion of the edge region of the meltblown nonwoven fabric by folding over the meltblown nonwoven fabric, optionally compressing same, and affixing same to the edge region of the meltblown nonwoven fabric preferably by means of adhesive, thermal welding, or mechanical pressing.

According to the invention, the voluminous meltblown nonwoven fabric has a weight per unit area of from 30 to 600 g/m$^2$, more preferably from 100 to 600 g/m$^2$. Good results in terms of the acoustic properties achieved are obtained particularly if the voluminous meltblown nonwoven fabric has a weight per unit area of from 100 to 400 g/m$^2$, preferably from 150 to 400 g/m$^2$, especially preferably from 200 to 400 g/m$^2$, and very especially preferably from 250 to 350 g/m$^2$, e.g., about 300 g/m$^2$.

According to the invention, the voluminous meltblown nonwoven fabric also has a density of from 5 to 50 kg/m$^3$. Good results in terms of the acoustic properties achieved are obtained particularly if the voluminous meltblown nonwoven fabric has a density of from 7 to 40 kg/m$^3$, preferably from 8 to 25 kg/m$^3$, and especially preferably from 10 to 20 kg/m$^3$, e.g., 15 kg/m$^3$.

The thickness of the meltblown nonwoven fabric is preferably 6 to 50 mm, more preferably 8 to 40 mm, very especially preferably 10 to 30 mm, and most preferably 15 to 25 mm, in particular about 15 or about 20 mm.

As for the chemical nature of the filaments, the meltblown nonwoven fabric of the present invention has no particular limitation. In principle, the filaments of the meltblown nonwoven fabric can consist of any polymer having a melting point that is suitable for extrusion and a viscosity that is sufficiently low in the molten state for the meltblown process, such as polyolefins, polyamides, polyesters, polyphenylene sulfides, polytetrafluoroethylene, or a polyether ether ketone. Filaments that are composed of a polymer selected from the group consisting of polyethylene terephthalate, polybutylene terephthalate, polypropylene, and polyethylene have proven to be especially suitable. The filaments of the meltblown nonwoven fabric according to the present invention are very especially preferably composed of isotactic polypropylene.

The meltblown nonwoven fabric can be manufactured by means of any of the known meltblown processes, such as those described in U.S. Pat. Nos. 4,118,531, 4,375,446, 4,380,570, or DE 17 85 712 C3, for example. As a basic principle, nonwoven fabric is manufactured using a meltblown process by applying flowing air to the outside of a polymer melt that is extruded through a die and drawing said polymer melt before the filaments that are formed in this way are placed onto a carrier and cooled. If a voluminous meltblown nonwoven fabric is to be formed, the carrier is preferably a double suction drum.

As a whole, the present invention makes it possible to manufacture a meltblown nonwoven fabric that can be stacked without distortion and is therefore easy to store.

Hereinafter, the present invention will be described below with reference to the clarifying but non-limiting drawing.

In the drawing:

FIG. 1 shows a schematic view of a meltblown nonwoven fabric 10 without spacers according to the prior art that has been manufactured according to the method described in DE 17 85 712 C3. The C-shaped structure within the meltblown nonwoven fabric 10 that is caused by the high-frequency reciprocation of the filament curtain that occurs in the manufacturing method described in DE 17 85 712.

Figure 1:
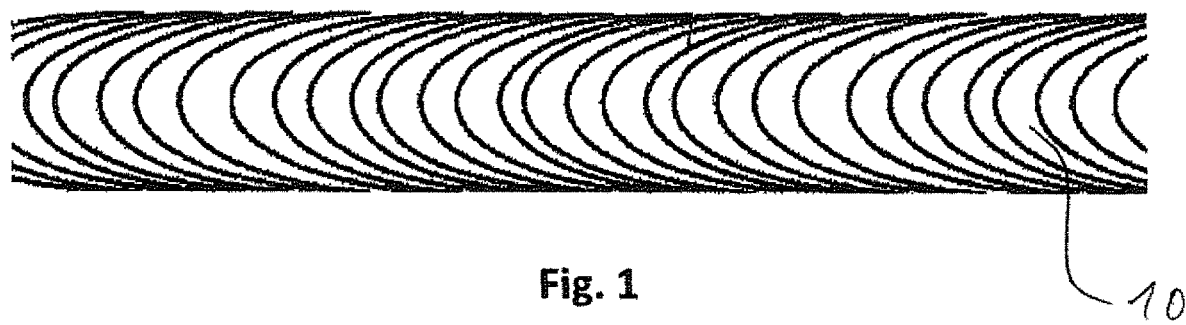
FIG. 1 shows a schematic view of a meltblown nonwoven fabric without spacers according to the prior art.
Figure 2:
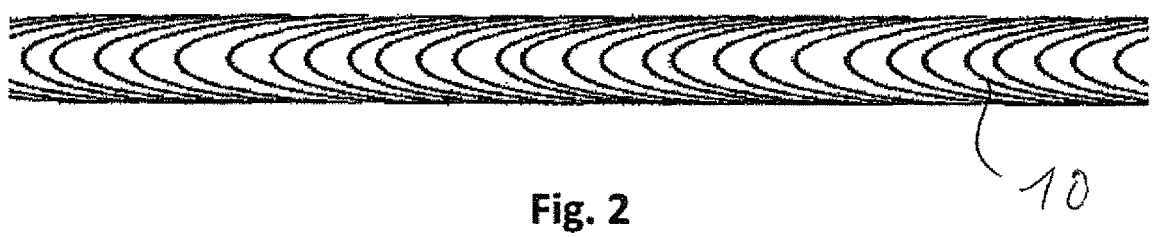
FIG. 2 shows a schematic view of a meltblown nonwoven fabric according to FIG. 1 that has been irreversibly deformed as a result of applied mechanical pressure.

If a meltblown nonwoven fabric 10 according to the prior art is acted upon by pressure for example as a result of stacking the meltblown nonwoven fabric 10 with multiple layers of the meltblown nonwoven fabric 10 the meltblown nonwoven fabric 10 is irreversibly compressed and remains deformed as shown in FIG. 2.

Figure 3:
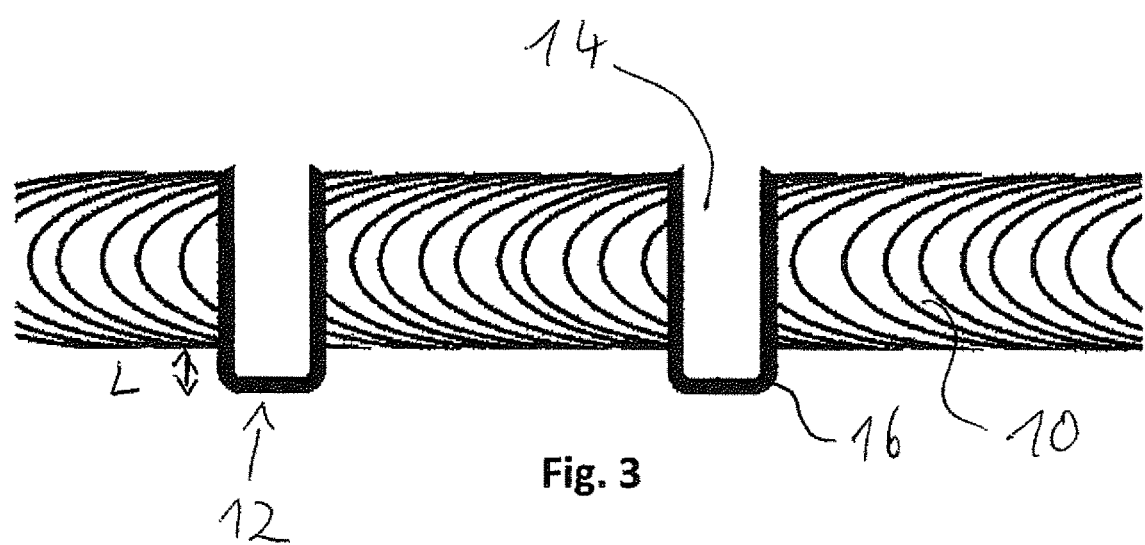
FIG. 3 shows a schematic view of a meltblown nonwoven fabric with spacers arranged in the direction of thickness of the meltblown nonwoven fabric according to a first exemplary embodiment of the present invention.

In order to increase the resistance to compression and thus the stackability of the meltblown nonwoven fabric 10, it is proposed according to the invention that at least one and preferably a plurality of spacers 12 be provided in the meltblown nonwoven fabric 10. The spacers 12 shown in FIG. 3 are depressions 14 formed through application of mechanical pressure whose side surfaces and bottom are delimited by compressed nonwoven fabric 16, with the bottom of the depression 14 that is delimited by the compressed nonwoven fabric 16 protruding beyond the lower side of the nonwoven fabric 10 by the distance L as seen in the direction of thickness. By virtue of the much higher mechanical stability of compressed nonwoven fabric 16 compared to the non-compressed nonwoven fabric 10, these spacers 12 can accommodate the pressure of overlying nonwoven fabric layers without deformation and thus allow stackability of the meltblown nonwoven fabric 10.

Figure 4:
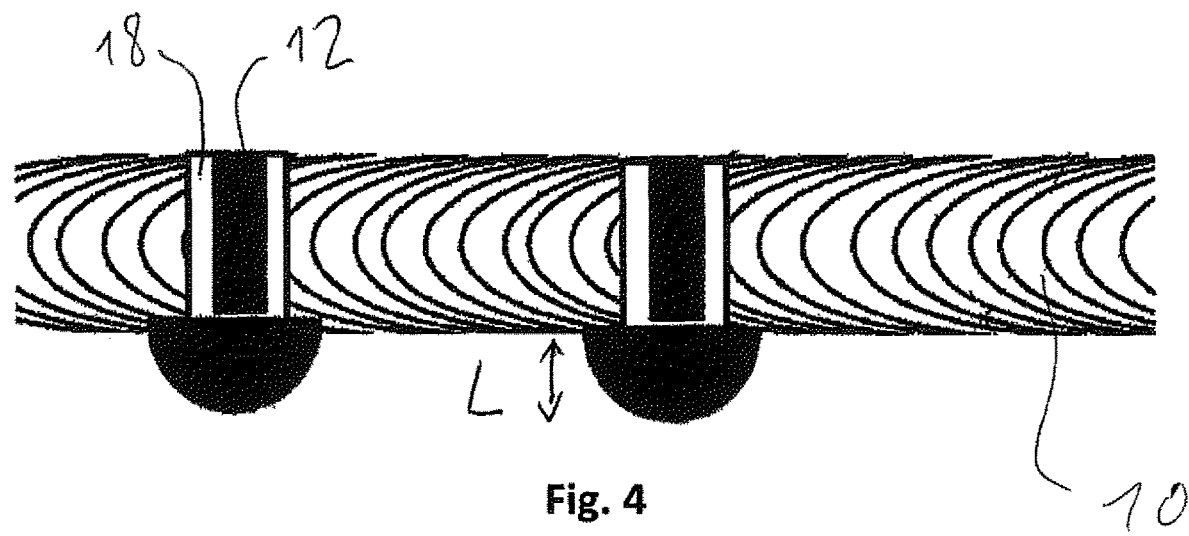
FIG. 4 shows a schematic view of a meltblown nonwoven fabric with spacers arranged in the direction of thickness of the meltblown nonwoven fabric according to a second exemplary embodiment of the present invention.

In the embodiment shown in FIG. 4, the spacers 12 that are arranged in the direction of thickness of the meltblown nonwoven fabric 10 are made of material other than nonwoven fabric, namely plastic mushroom-shaped elements 12. The spacers extend through an opening 18 that was previously introduced in a pressure-free manner into the nonwoven fabric 10 and, in this example, protrude beyond the lower side of the nonwoven fabric 10 by the distance L.

Figure 5:
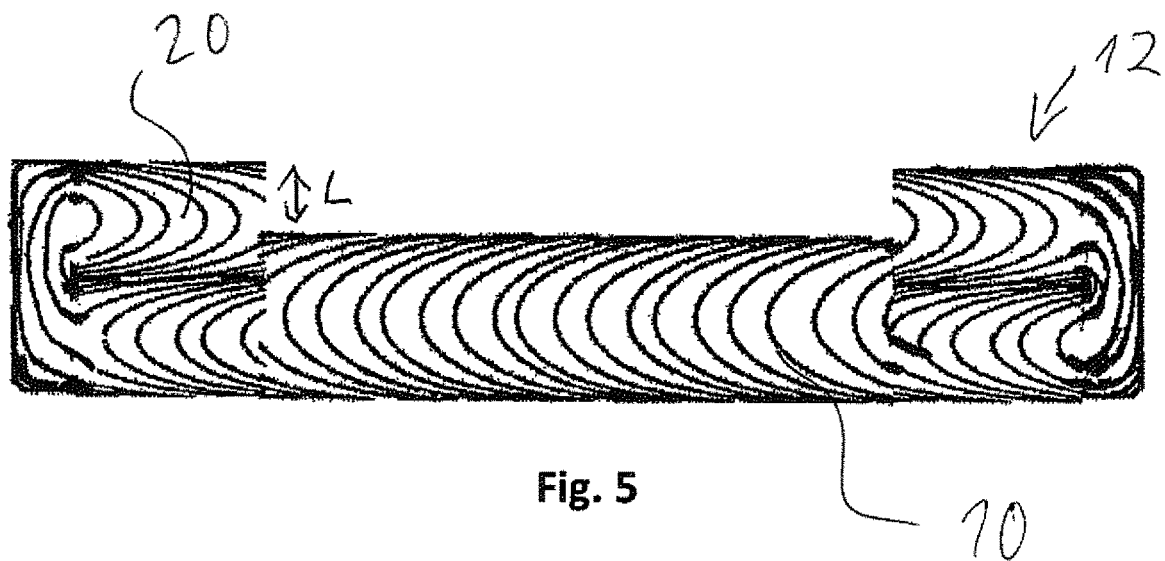
FIG. 5 shows a schematic view of a meltblown nonwoven fabric with spacers arranged in the direction of thickness of the meltblown nonwoven fabric according to a third exemplary embodiment of the present invention.

In the embodiment shown in FIG. 5, an additional nonwoven fabric 20 is applied to the left edge and to the right edge of the meltblown nonwoven fabric 10 as a spacer, so that the total thickness in these regions of the meltblown nonwoven fabric 10 is greater than that of the rest of the nonwoven fabric. In this case, the additional nonwoven fabric 20 has been applied to both edges through folding-over of the meltblown nonwoven fabric 10, compression, and attachment by means of adhesive.

By virtue of the fact that spacers 12 are provided in the meltblown nonwoven fabric 10 that extend on at least one of the surfaces of the meltblown nonwoven fabric 10 and/or at least partially in the direction of thickness of the meltblown nonwoven fabric 10 and are arranged such that the meltblown nonwoven fabric 10 has a compressibility of less than 10% when a pressure of 50 Pa is applied to its surface, various layers of the meltblown nonwoven fabric 10 can be easily stacked on top of one another without causing unacceptable deformation and particularly compression of the meltblown nonwoven fabric 10, since the various layers each contact their spacers 12 and are mutually spaced apart by these in such a way that the upper layers do not compress the lower layers by their weight. Easy storability of the meltblown nonwoven fabric 10 is thus achieved.

The present invention will be described below with reference to clarifying but non-limiting examples.

EXAMPLE 1

A meltblown nonwoven fabric having a weight per unit area of 300 g/m² and a thickness of 15 mm was prepared from filaments of isotactic polypropylene with a mean filament fineness of 5 μm. Spacers made of polystyrene having the shape shown in FIG. 4 and a maximum resistance to compression of greater than 2 kg were introduced into this meltblown nonwoven fabric as described previously in connection with this embodiment, particularly in such a way that the grid dimension i.e., the spacing between the individual spacers was 20 cm×20 cm.

Sixty-six layers of this nonwoven fabric were stacked on top of one another so that the total stack height was about 1 meter. The compressive load for the lowermost layer was therefore 20 kg/m², corresponding to about 200 Pa, meaning that the compressive load for each of the 25 spacers per square meter was 800 g. Since each spacer is dimensionally stable at this pressure, no change in the thickness of the lowermost layer could be identified. Therefore, the compressibility of the meltblown nonwoven fabric of the lowermost layer was 0% under a load of 200 Pa applied to its surface.

LIST OF REFERENCE SYMBOLS

10 meltblown nonwoven fabric
12 spacer
14 depressions
16 compressed nonwoven fabric
18 opening
20 additional nonwoven fabric
L distance by which the bottom of the depression that is delimited by the compressed nonwoven fabric protrudes beyond the lower side of the nonwoven fabric as seen in the direction of thickness.

The invention claimed is:

1. A meltblown nonwoven fabric (10) in the form of a planar structure with a weight per unit area from 100 to 600 g/m² and with a density of from 5 to 50 kg/m³, the meltblown nonwoven fabric (10) comprising a first surface and a second surface separated by a thickness and having at least one spacer (12) extending on at least one of the first surface or the second surface and at least partially through the thickness of the meltblown nonwoven fabric (10), and the meltblown nonwoven fabric (10) has a compressibility of less than 10% when a pressure of 50 Pa is applied to a surface, compressibility being defined as:

$$\frac{\text{inital thickness minus thickness under pressure}}{\text{initial thickness}} \times 100\%$$

wherein the at least one spacer (12) is made of compressed nonwoven fabric (16) that is a depression formed in one of the first surface or the second surface of the meltblown nonwoven fabric (10) through the application of mechanical pressure, wherein side surfaces and bottom of the depression are delimited by compressed nonwoven fabric (16), and wherein the bottom of the depression being delimited by the compressed nonwoven fabric is between 0% and 10% of the thickness of the meltblown nonwoven fabric (10) from an other of the first surface or the second surface and or protrudes beyond the other of the first surface or the second surface of the meltblown nonwoven fabric (10).

2. The meltblown nonwoven fabricas set forth in claim 1, wherein the meltblown nonwoven fabric (10) has a compressibility of less than 10% when a pressure selected from any of 75 Pa, 125 Pa, 150 Pa, 175 Pa, 200 Pa, and 250 Pa is applied to its surface.

3. The meltblown nonwoven fabric as set forth in claim 1, wherein the depression (14) has a width of from 0.1 to 5 times the thickness of the nonwoven fabric (10).

4. The meltblown nonwoven fabric as set forth in claim 1, wherein the at least one spacer is a plurality of spacers forming a plurality of depressions (14) that are spaced apart from one another by 50 to 500 mm as seen on the nonwoven fabric plane.

5. The meltblown nonwoven fabric as set forth in claim 1, wherein the meltblown nonwoven fabric (10) has a weight per unit area of from 100 to 400 g/m².

6. The meltblown nonwoven fabric as set forth in claim 1, wherein the meltblown nonwoven fabric (10) is a voluminous meltblown nonwoven fabric (10) having a density of from 8 to 25 kg/m³.

7. The meltblown nonwoven fabric as set forth in claim 1, wherein the thickness of the meltblown nonwoven fabric (10) is from 6 to 50 mm.

8. A meltblown nonwoven fabric (10) in the form of a planar structure with a weight per unit area from 100 to 600 g/m² and with a density of from 5 to 50 kg/m³, the meltblown nonwoven fabric (10) comprising a first surface and a second surface separated by a thickness and having at least one spacer (12) extending on at least one of the first surface or the second surface, and optionally at least partially through the thickness of the meltblown nonwoven fabric (10), and the meltblown nonwoven fabric (10) has a compressibility of less than 10% when a pressure of 50 Pa is applied to a surface, compressibility being defined as:

$$\frac{\text{inital thickness minus thickness under pressure}}{\text{initial thickness}} \times 100\%$$

wherein the at least one spacer (12) is made of a material other than a nonwoven fabric selected from one among metal, plastic, ceramic, wood, glass, and any combination of two or more of the aforementioned materials, the at least one spacer (12) being affixed to the first surface and/or the second surface with adhesive, a connecting element, thermal welding, or mechanical pressure.

9. The meltblown nonwoven fabricas set forth in claim 8, wherein the meltblown nonwoven fabric (10) has a compressibility of less than 10% when a pressure selected from any of 75 Pa, 125 Pa, 150 Pa, 175 Pa, 200 Pa, and 250 Pa is applied to its surface.

10. The meltblown nonwoven fabric as set forth in claim 8, wherein the at least one spacer (12) has a cylindrical, cuboidal, or mushroom-like shape.

11. The meltblown nonwoven fabric as set forth in claim 8, wherein the at least one spacer is a plurality of spacers (12) that are spaced apart from one another by 50 to 500 mm as seen on the nonwoven fabric plane.

12. A meltblown nonwoven fabric (10) in the form of a planar structure with a weight per unit area from 100 to 600 g/m² and with a density of from 5 to 50 kg/m³, the meltblown nonwoven fabric (10) comprising a first surface and a second surface separated by a thickness and having at least one spacer(12) extending at least partially through the thickness of the meltblown nonwoven fabric(10), and optionally on at least one of the first surface or second surface, and the meltblown nonwoven fabric (10) has a compressibility of less than 10% when a pressure of 50 Pa is applied to a surface, compressibility being defined as:

$$\frac{\text{inital thickness minus thickness under pressure}}{\text{initial thickness}} \times 100\%$$

wherein the at least one spacer(12) is made of a material other than a nonwoven fabric selected from one among metal, plastic, ceramic, wood, glass, and any combination of two or more of the aforementioned materials, the at least one spacer(12) extending through an opening previously introduced in a pressure-free manner into the meltblown nonwoven fabric (10) and has a dimension being 90 to 100% of the thickness of the meltblown nonwoven fabric (10) or has a dimension comprising at least a part of the thickness of the meltblown nonwoven fabric (10) and protrudes beyond the first surface and/or the second surface.

13. The meltblown nonwoven fabricas set forth in claim 12, wherein the meltblown nonwoven fabric (10) has a compressibility of less than 10% when a pressure selected from any of 75 Pa, 125 Pa, 150 Pa, 175 Pa, 200 Pa, and 250 Pa is applied to its surface.

14. The meltblown nonwoven fabricas set forth in claim 12, wherein the at least one spacer is a plurality of spacers (12) that are spaced apart from one another by 50 to 500 mm as seen on the nonwoven fabric plane.

15. The meltblown nonwoven fabricas set forth in claim 12, wherein the spacer has a cylindrical, cuboidal, or mushroom-like shape.

16. A meltblown nonwoven fabric (10) in the form of a planar structure with a weight per unit area from 100 to 600 g/m² and with a density of from 5 to 50 kg/m³, the meltblown nonwoven fabric (10) comprising a first surface and a second surface separated by a thickness and having at least one spacer (12) extending on at least one of the first surface or the second surface, and optionally at least partially through the thickness of the meltblown nonwoven fabric (10), and the meltblown nonwoven fabric (10) has a compressibility of less than 10% when a pressure of 50 Pa is applied to a surface, compressibility being defined as:

$$\frac{\text{inital thickness minus thickness under pressure}}{\text{initial thickness}} \times 100\%$$

wherein the at least one spacer (12) is additional nonwoven fabric placed onto at least a portion of an edge region of the meltblown nonwoven fabric(10) by folding over the meltblown nonwoven fabric (10) and affixing to the edge region by means of adhesive, thermal welding, or mechanical pressure, such that a total thickness in the at least the portion of the edge region is greater than the thickness of the meltblown nonwoven fabric prior to folding.

17. The meltblown nonwoven fabricas set forth in claim 16, wherein the meltblown nonwoven fabric (10) has a compressibility of less than 10% when a pressure selected from any of 75 Pa, 125 Pa, 150 Pa, 175 Pa, 200 Pa, and 250 Pa is applied to its surface.

18. The meltblown nonwoven fabric as set forth in claim 16, wherein the at least one spacer (12) comprises additional nonwoven fabric placed onto at least a portion of opposing edge regions, as seen on the nonwoven fabric plane, by folding over the meltblown nonwoven fabric (10) at both of the opposing edge regions.

19. A stack of two or more of the meltblown nonwoven fabric as set forth in claim 1.

* * * * *